July 24, 1923.

C. H. LOEW ET AL

BOTTLE CLEANING APPARATUS

Filed May 9, 1918

C. H. LOEW ET AL

1,462,512

BOTTLE CLEANING APPARATUS

Filed May 9, 1918

Patented July 24, 1923.

1,462,512

UNITED STATES PATENT OFFICE.

CHARLES H. LOEW AND JOHN R. GRUETTER, OF LAKEWOOD, OHIO.

BOTTLE-CLEANING APPARATUS.

Application filed May 9, 1918. Serial No. 233,431.

*To all whom it may concern:*

Be it known that we, CHARLES H. LOEW and JOHN R. GRUETTER, citizens of the United States, residing at Lakewood, in the county of Cuyahoga and State of Ohio, have invented a certain new and useful Improvement in Bottle-Cleaning Apparatus, of which the following is a full, clear, and exact description, reference being had to the accompanying drawings.

This invention relates to bottle cleaning apparatus and more particularly to an apparatus wherein the bottles are conducted by a conveyor through an enclosure wherein they are subjected repeatedly to the action of cleaning liquid, applied externally and internally to the bottles. It is the general object of the invention to provide an apparatus wherein the bottles will be thoroughly and efficiently soaked, cleaned, and sterilized and the labels removed therefrom in their transit through such apparatus; to secure this result in a more efficient manner than has heretofore been accomplished; also to secure this result in and through an apparatus wherein a major proportion of the operations will be accomplished in and through automatically operating means; also to provide an apparatus of the character with means whereby its operation will be automatically suspended should the operator inadvertently place therewithin a bottle having a closure, thereby preventing injury to the bottle cleaning mechanism and more particularly to the internal cleaning devices. Further and more limited objects of the invention will appear in the specification hereinafter and will be secured in and through the combinations of elements embodied in the claims hereto annexed.

The apparatus which is illustrated and described herein comprises generally an enclosure having a plurality of jetting stations at which water is supplied under forceful pressure to the bottles to be cleaned; an intermittently operated conveyor which conducts the bottles, arranged in transverse rows thereupon, in operative relation to and past said stations; pumps for forcing the cleaning liquid into and against the bottles; means for heating the liquid supplied to certain of said stations; means for removing the labels from the apparatus; means for brushing the bottoms of the bottles prior to their delivery from the enclosure; and means for automatically suspending the operation of the apparatus, and particularly of the conveyor and the internal rinsing spindles, in the event that a bottle having a closure or stopper applied thereto has been placed upon the conveyor by the operator.

In the drawings forming a part hereof Figs. 1 and 1ª represent side elevations, with parts broken away, of the front and rear portions respectively of our apparatus, the two views comprehending the entire apparatus and parts of the operating mechanism being omitted, for clearness of illustration; Figs. 14 and 15 details in elevation and section, respectively, of another portion of such control.

*Enclosure and liquid supplying devices.*

Figure 1:
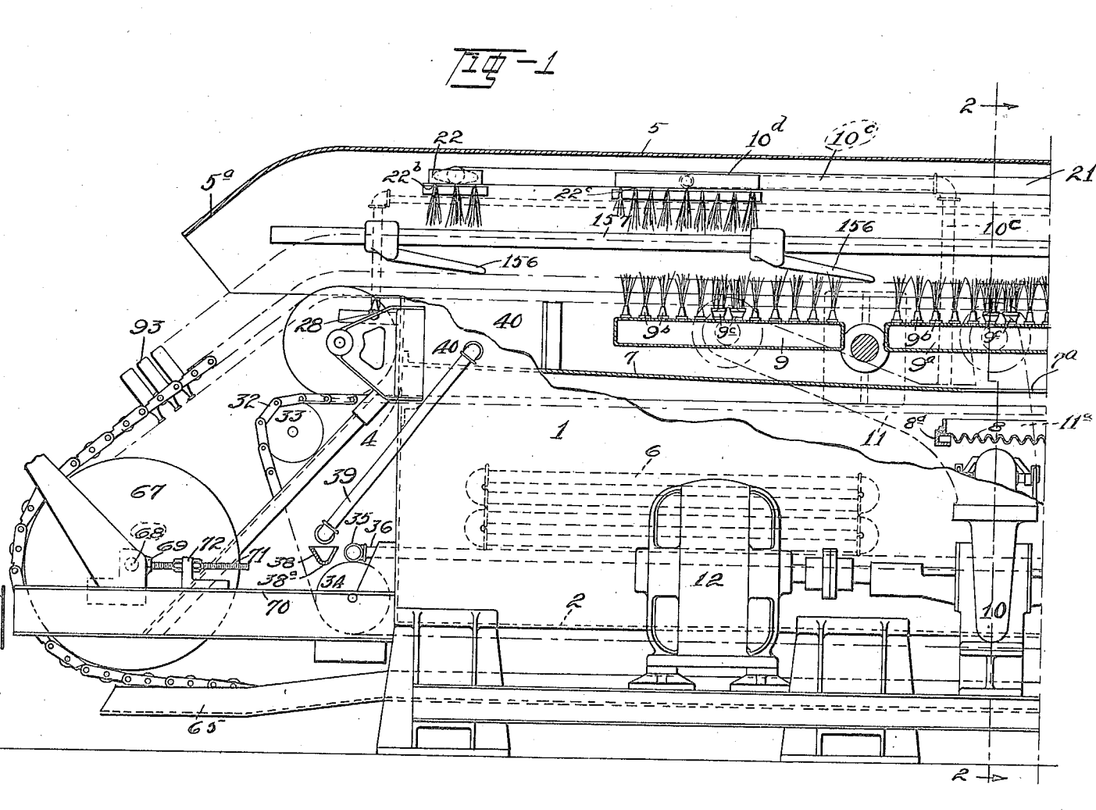
Figure 2:
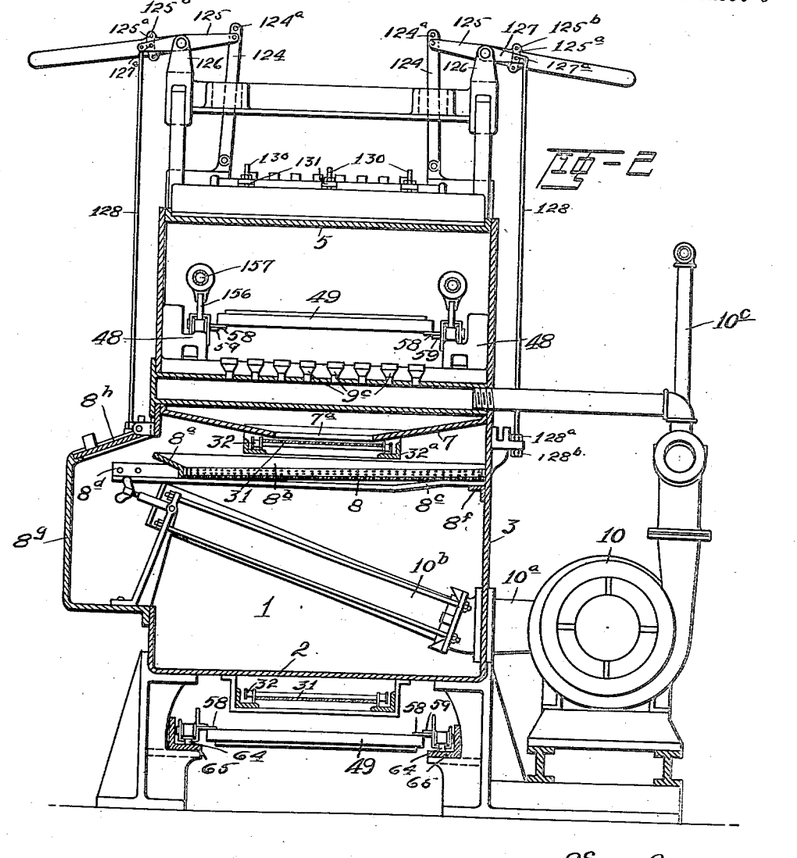
Figs. 2 and 3 are transverse sectional views corresponding respectively to the lines 2—2 of Fig. 1 and 3—3 of Fig. 1ª.

The enclosure comprises generally a tank 1 having a bottom 2, side walls 3 and end walls 4, 4ª, (see Figs. 1, 1ª and 2) the end wall 4ª having a horizontal extension 4ᵇ, and upwardly inclined extension 4ᶜ, and a vertical extension 4ᵈ. The side walls support a roof 5 which is extended at the front or receiving end, as indicated at 5ª, so as to overhang the wall 4 and certain parts of the mechanism in front of said wall.

Within the tank 1 there is a heating coil 6 supplied by steam from any convenient source whereby the solution in said tank (as caustic soda) is maintained at a temperature of about 165° F., this liquid being protected against the entry of labels and other sediment coming from the bottles thereabove by means of a cover 7 which is inclined downwardly from the walls 4 and 4ª and from the side walls 3 to an opening 7ª arranged above a combined strainer and label remover. This combined strainer and label remover comprises a perforated strainer element 8 connected to side and end walls 8ª and 8ᵇ respectively, the side and end walls being preferably flanged outwardly at the tops thereof. The strainer element 8 is corrugated, the corrugations extending transversely of the tank 1, and is supported on angle iron guide rails 8ᵈ extending transversely of the tank beneath the opening 7ª. Each of these guide rails has the lower flange thereof bent upwardly, as shown at 8ᶜ, whereby one end of the strainer will be elevated above the other for the purpose of facilitating the movement of the labels and other material toward the delivery side of the strainer as well as the removal thereof from the tank. One end of each guide rail 8ᵈ may be supported by means of an angle iron 8ᶠ secured to a wall 3, the other ends of said rails projecting into a compartment 8ᵍ formed in the opposite wall of the tank, said compartment having an opening closed by a door 8ʰ above the ends of the rails, said door permitting access to the strainer for the purpose of removing the labels and other material therefrom as well as permitting the removal of the strainer itself bodily when occasion may require.

Figure 9:
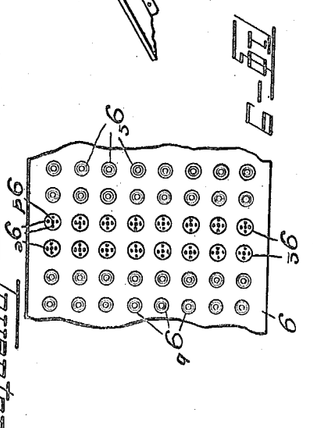
Fig. 9 a fragmental plan view of one of the washing or rinsing boxes.

Liquid from the compartment included between the walls 2, 3, 4, 4ª and the cover 7 is forced through a pair of jet boxes 9 and 9ª by means of a pump 10 the inlet 10ª whereof communicates with the bottom of the tank through a strainer 10ᵇ and the delivery whereof is provided with branches 11 and 11ª discharging respectively into the boxes 9 and 9ª. Each of the boxes 9 and 9ª is provided with transverse series of jet nozzles 9ᵇ, 9ᶜ, respectively, arranged to discharge into the mouths of the bottles on the conveyor thereabove as well as against the sides of the bottles as they are being moved. As will appear more particularly from Figs. 1 and 9, the two central transverse series of jet nozzles 9ᶜ are provided each with a central orifice 9ᵈ with four orifices 9ᵉ grouped equidistantly about the central orifice and spaced equidistantly therefrom. The remaining nozzles 9ᵇ are provided each with a single orifice only. The advantage of this construction will be pointed out hereinafter. Water from the same main compartment is forced by the pump 10 through the pipe 10ᶜ to a jet box 10ᵈ, located preferably above one of the boxes 9. The pump 10 is shown as driven by an electric motor 12 through the shaft 13. This shaft is extended to the rear of the pump 10 and there provided with a pulley 14 (see Figs. 1ª and 4), which through a belt 15 and a pulley 16, drives the shaft 17 of a second pump 18. The inlet side of the pump 18 is connected with the well 19ª of a tank 19 having for its bottom the wall 4ᶜ and for its rear side the wall 4ᵈ, the front wall being indicated at 19ᵇ. Water from the tank 19 is forced by the pump 18 through the pipe 20 to the pipe 21 extending longitudinally of the apparatus and beneath the cover 5, said pipe being connected with the external rinsing jet box 22 at the front of the apparatus and with a similar rinsing jet box 23 at the rear of the apparatus, each box being provided with transverse series of jet openings, indicated at 22ᵇ, 22ᶜ and 23ª, respectively. The temperature of the water supplied to the box 22 will be about 135° F. and that supplied to the box 23 will be about 130° F., this difference in temperature being due to conducting the liquid through the long pipes 20 and 21 extending from the pump 18 to the front of the apparatus, the water in the pipe being meanwhile subjected to the relatively high temperature within this part of the apparatus due to the temperature of the water supplied to the jets of the boxes 9, 9ª.

Figure 4:
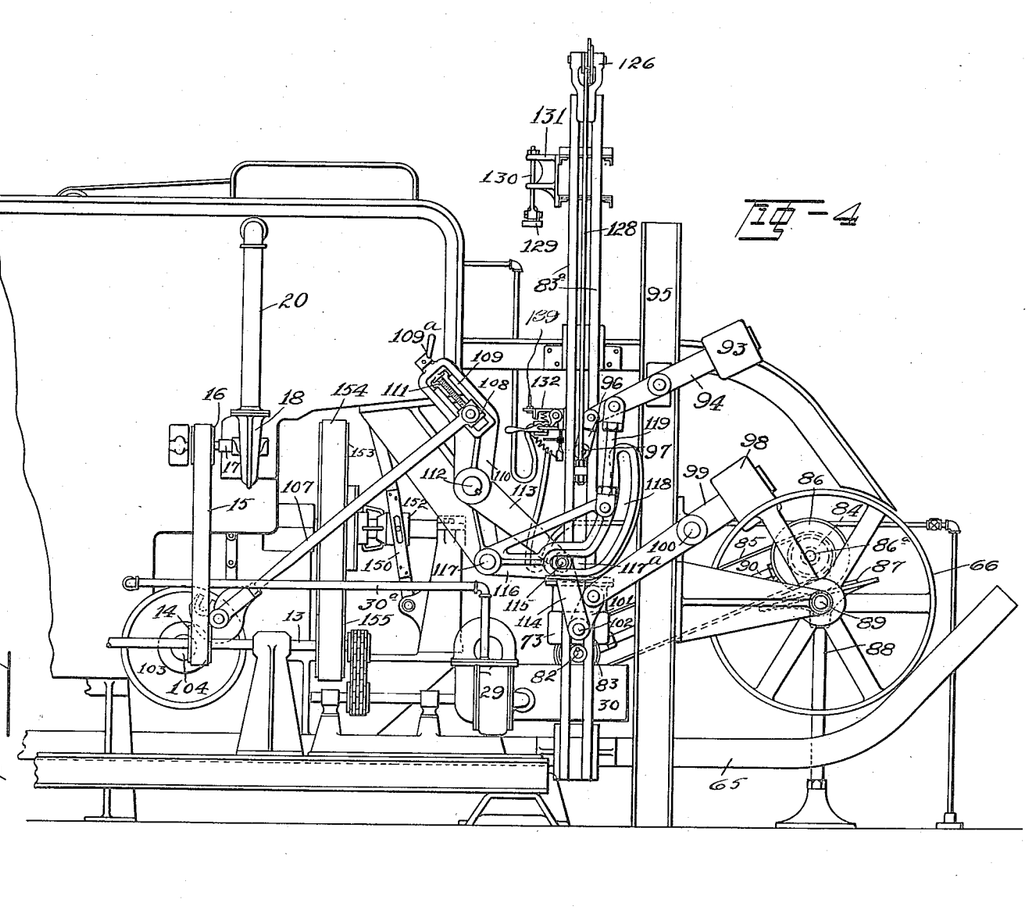
Fig. 4 a side elevation of the rear portion of our apparatus and Fig. 5 a similar view taken from the opposite side.

The tank 19, from which the pump 18 is supplied receives the waste water from the rinsing box 23; also the waste water from the transverse series of jet nozzles 24 located below the bottle conveyor. The jet nozzles 24 are connected by pipes 25 and 27 with a heating coil 26 located in the rear portion of the main tank. The jet nozzles are also connected by the pipe 27 to a transverse series of jet nozzles 28 at the front of the apparatus. Liquid for the coil 26 is supplied by a two-stage pump 29 (see Figs. 1ª and 4), the intake whereof communicates with a tank 30 arranged beneath the final cleaning station and which tank receives the waste water from such station. The delivery pipe 30ª from the pump 29 communicates with the coil 26, and the water which is warmed by the solution in the tank 1 is forced by the pump 29 to the nozzles 24 and 28. The parts are so proportioned that the temperature of the water supplied by the jets 28 and 24 is about 120° F., and 100° F., respectively.

It will be observed that, because of the length of the boxes 9 and 9ª and the large number of transverse series of nozzles carried jointly thereby, the bottles will be subjected to a most thorough internal cleansing by the caustic soda solution at a temperature of about 165° F. The arrangement described prepares the entering bottles for the high temperature cleaning liquid discharged through the nozzles 9ᵇ and 9ᶜ; after having been thoroughly cleaned by the high temperature caustic solution, the bottles, by being conducted through and past the jets at 23 and 24, are gradually reduced in temperature to the point where they can withstand, without fracture, the cold water at the final cleaning station, located outside of the tank proper and which will be described in detail hereinafter.

Reference has been made heretofore to the pump 18 taking from the tank 19 a mixture of liquid discharged from the jet box 23 and the nozzles 24 at temperatures of respectively about 130° F. and 100° F. The bottles, after having passed above the jet boxes 9 and 9ª and having been subjected for so long a period to the high temperature liquid supplied therefrom, are themselves heated to a temperature approximating that of the liquid. Such being the case, these bottles impart such an amount of heat to the water discharged thereupon from the jets 23ª and thereinto from the nozzles 24 that the temperature of the water in the tank 19 will be approximately 130°; hence the liquid supplied to the box 23 will be approximately 130° F. while that supplied to the box 22 will be somewhat higher owing to the exposure of the pipe 21 to the higher temperature within the casing above the boxes 9 and 9ª.

Interposed between the cover 7 and the combined strainer and label remover 8 is an endless perforated label conveyor, said conveyor comprising a plurality of perforated transverse sections 31, each having a rocking connection with the other and carried by conveyor chains 32 the links whereof are equal in length to the width of each section 31. These chains are supported above the combined strainer and label remover by means of rails 32ª extending longitudinally of the tank and arranged below the opening 7ª. The label conveyor extends through the tank, the chains being carried and driven by sprockets 33, 33ª, 34, 34ª, the sprockets 34ª being on the shaft 104 located at the front and rear end of the apparatus. The upper branch of the label conveyor is driven rearwardly of the sprocket 33 and extends downwardly and forwardly around the pulley 34, thence to the pulley 34ª at the rear of the apparatus. The reverse surface of the conveyor is exposed to water discharged through a transversely extending spray pipe 35 to which water is conducted by a pipe 36 from a tank 37 located beneath and receiving water from the transverse series of nozzles 37ª at the final rinsing station, said nozzles being preferably supplied with cold water from the main. The label conveyor is substantially the same as disclosed and claimed in the application of John R. Gruetter, Serial No. 691,478, filed April 17, 1912.

Located rearwardly of the spray pipe 35 is a transversely extending trough 38 having perforations 38ª in the bottom thereof for distributing liquid to the reverse side of the conveyor, water for such purpose being conducted to the trough by means of a pipe 39 communicating with a tank 40 located beneath the washing box 22.

The label collector 8 receives labels and sediment that may overflow from the sides of the label conveyor as well as any matter that may happen to pass through the perforations of said conveyor.

It will be noted that, between the jet boxes 23 and 24, there is located a rotary brush 41 which operates upon the bottoms of the bottles after the bottles have received their last external washing from the jet box 23. This brush may be driven in any convenient manner from the shaft 13, as by countershafting including the shaft 42, pulley 43, belt 44, pulleys 45, 45ª, pulley 46 and sprockets 47 and 47ª, the last mentioned sprocket being on the brush shaft 41ª. The driving connections between the shaft 42 and shaft 13 will be set forth hereinafter in connection with other parts of the apparatus.

*Conveyor mechanism.*

Figure 6:
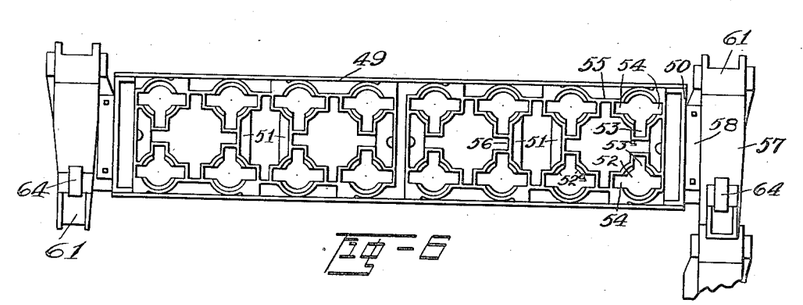
Fig. 6 a detail in plan and Fig. 7 a detail in side elevation, with parts broken away, of one of the bottle conveyor elements.
Figure 7:
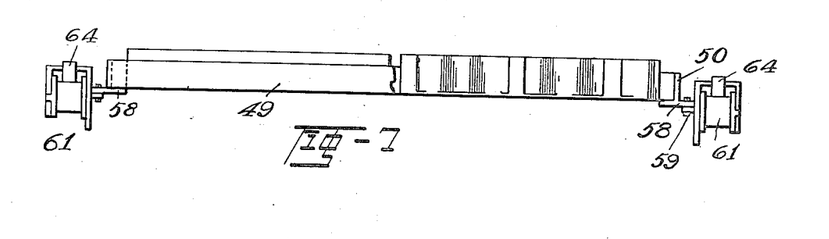
Figure 8:
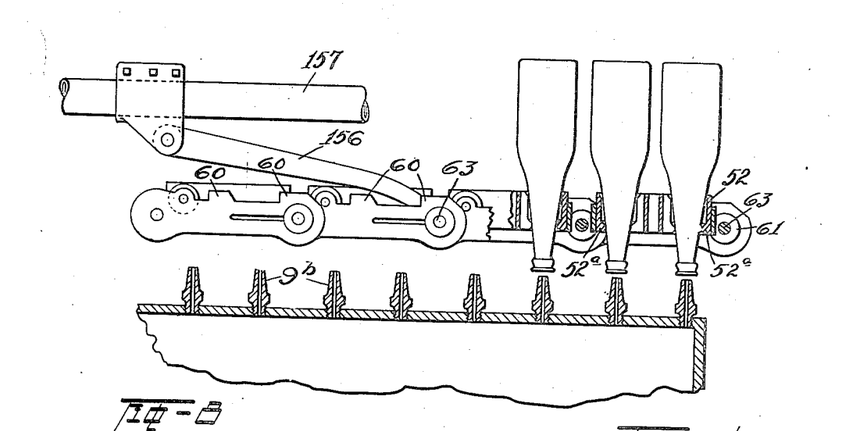
Fig. 8 a detail, partly in elevation and partly in section of a portion of the bottle conveyor, the operating means therefor, and one of the washing or rinsing boxes.

Cooperating with the various cleaning stations is the mechanism for conveying the bottles in operative relation thereto. This mechanism is similar to that illustrated, described and claimed in our application No. 721,107 filed September 18, 1912. It consists essentially of an endless conveyor made up of a plurality of elements, each element comprising two transverse series of bottle supporting members, the elements being connected by side links or plates in the fashion of a chain and said side links or plates being provided with projections or detents which are arranged to be engaged by pawls carried by reciprocable bars, said bars being driven intermittently from the motor shaft 13. 48 and 65 denote the rails which are adapted to support the conveyor and supported respectively above and below the tank 1 in any convenient manner (see Fig. 3). One element of the conveyor constructed as described is shown in Figs. 6, 7 and 8 and comprises generally a transverse frame comprising a pair of side straps 49 connected at their ends by angle bars 50 and having bolted thereto two castings 51, each casting comprising eight bottle supports. Each bottle support comprises generally an outer wall providing a tapered or frusto conical seat for a bottle neck, there being a slot extending longitudinally of the conveyor and a pair of slots extending transversely thereof, said slots opening into the central tapered opening of the holder. The outer wall of each support is indicated generally at 52, said wall being of the outline shown in Fig. 6, and the tapered seat is provided between the circular portions of the upper edge of said wall and the inwardly projecting circular portions 52ª at the bottom of said wall. It will be seen that each conveyor element comprises a pair of castings, each casting having four bottle neck supports at the front thereof and four such supports at the rear thereof each of the front bottle neck supports is provided with a slot 53 extending rearwardly therefrom while each rear support is provided with a similar slot 53ª extending forwardly therefrom. In addition, each support is provided with transversely extending slots 54 extending in opposite directions therefrom, the slots 53 and 54 merging with the opening at the center of each support. The eight seats of each casting 51 are connected by narrow webs 55 and 56. The construction provides a bottle conveyor element which may be produced by casting and which, notwithstanding this fact, will be comparatively light as well as inexpensive of production. The slots 53ª enable the outsides of the bottles to be cleaned by liquid passing therethrough as the conveyor is moved, and the slots 54 permit discharge of liquid through the conveyor from the jets above the latter.

The ends of the frame comprising the straps 49 and cross bars 50 are connected to the side links 57 by means of flanges 58 projecting from the angle bars 50 and bolted to flanges 59 projecting from the links. Each link has a pair of upwardly projecting shoulders 60 providing each a ratchet tooth, whereby the conveyor will be driven at a speed such that each row of bottles thereon will be subjected to the action of each transverse series of jets therebeneath. One end of each link is widened to receive the narrow end of the adjacent link, and the other end of each link is narrowed as indicated at 61 to fit into the widened end 62 of its adjacent link, the links being connected by pins 63, as is usual in chain construction and each link is provided with a roller 64 which serves to support the lower branch of the conveyor on the rails 65 located beneath the tank (see Fig. 3). The bottom of each link is preferably channel shaped in cross section, as will be seen by reference to Fig. 7, and the upper branch of the conveyor is supported by the engagement of these channel shaped links with the rails 48. The conveyor passes over guiding and supporting wheels 66 and 67 located respectively at each side of the front and back of the apparatus, the last mentioned wheels being preferably carried by a shaft 68 supported in journal boxes 69 adjustably mounted upon guides 70, which journal boxes may be moved along said guides by means of adjusting screws 71 extending through brackets 72, this arrangement permitting of the taking up of the slack in the conveyor from time to time.

*Final external rinsing station.*

Reference has been made heretofore to the final washing or cleaning station which is located outside of the tank at the delivery end thereof. This final cleaning station comprises two transverse series of rotary hollow brush-carrying spindles carried by a reciprocatory gear and liquid supply box whereby the spindles are projected into the bottles thereabove, with clamping means for the bottoms of the bottles and means, operative by the movement of said box, for automatically moving said clamping means; and two transverse series of fixed jet nozzles at the rear of the hollow brush carrying spindles. In order to avoid injury to the spindles, brushes, and the other mechanism, means are provided for automatically suspending the operation of the machine, prior to the movement of a spindle into bottle cleaning position, should the operator inadvertently insert into the conveyor a bottle from which the closure has not been removed.

Figure 3:
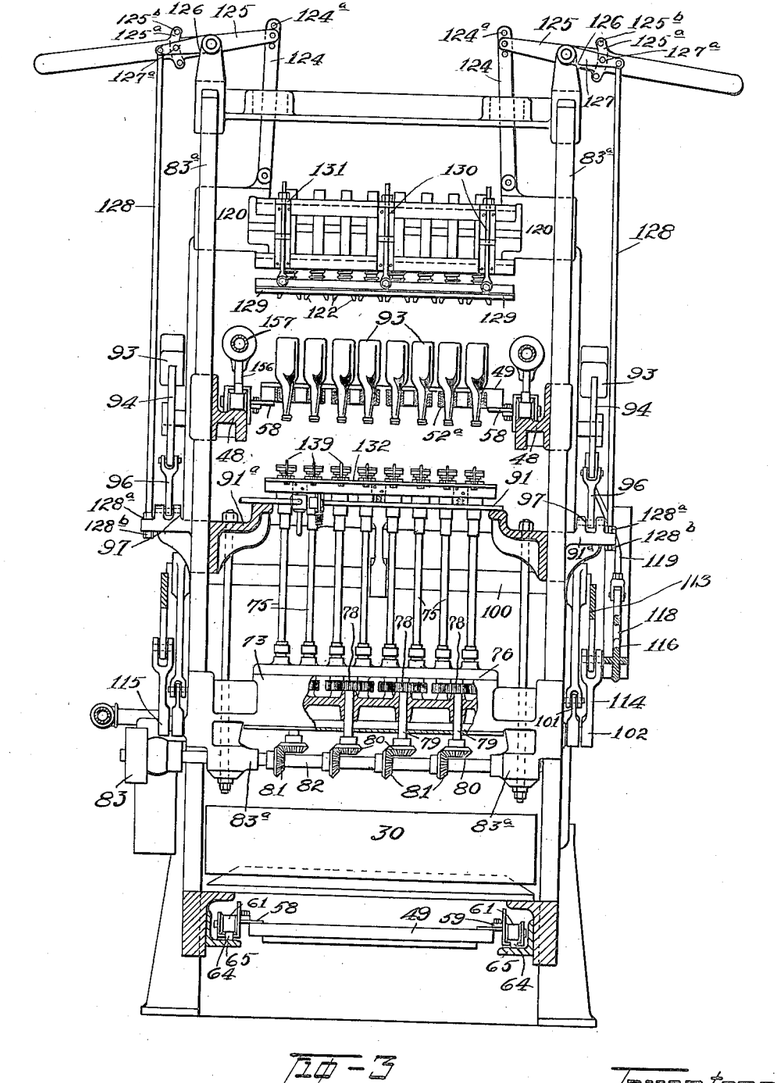

The gear and liquid containing box referred to is indicated at 73 and the two series of transverse spindles at 74 (Figs. 1ª and 3) each having its lower end suitably journaled in a sleeve 75 projecting from a cover 76, said cover forming with the bottom of the box a receptacle for water admitted to the spindles, the water being supplied by a hose or similar flexible connection 77 leading to the main or other source of supply for cold water. The spindles and their gears are so arranged that the gears intermesh in pairs in each transverse series, there being a master gear 78 interposed between and common to the corresponding pairs of gears of each transverse series, whereby each master gear may drive four spindles. The shafts for the master gears are indicated at 79, there being four such shafts each having at its lower end a beveled pinion 80 and each beveled pinion being driven by a corresponding beveled pinion 81 mounted on a shaft 82 driven by a pulley 83 which is in turn driven by a pulley 84 (see dotted lines Fig. 4) through a belt 85, the pulley 84 being driven by a shaft 86ª of a motor 86 which is mounted on a platform 87 rotatably connected to a standard 88 as indicated at 89. A distance or radius rod 90 keeps the pulleys 83 and 84 a fixed distance apart during the reciprocation of the box 73. The pulley shaft 82 is mounted in vertical guides 83ª and, as the box 73 is raised and lowered, the motor 86 and the pulley 84 will be rocked about the pivot 89. The particular manner of rotating and supplying water to the hollow spindles and the means for rotating said spindles of itself forms no part of the invention disclosed herein, the same forming the subject matter of the application of John R. Gruetter No. 691,478, filed April 17, 1912, and of our co-pending application No. 155,422, filed March 17, 1917, the latter application covering the construction and arrangement of the parts 83-90 inclusive.

Figure 10:
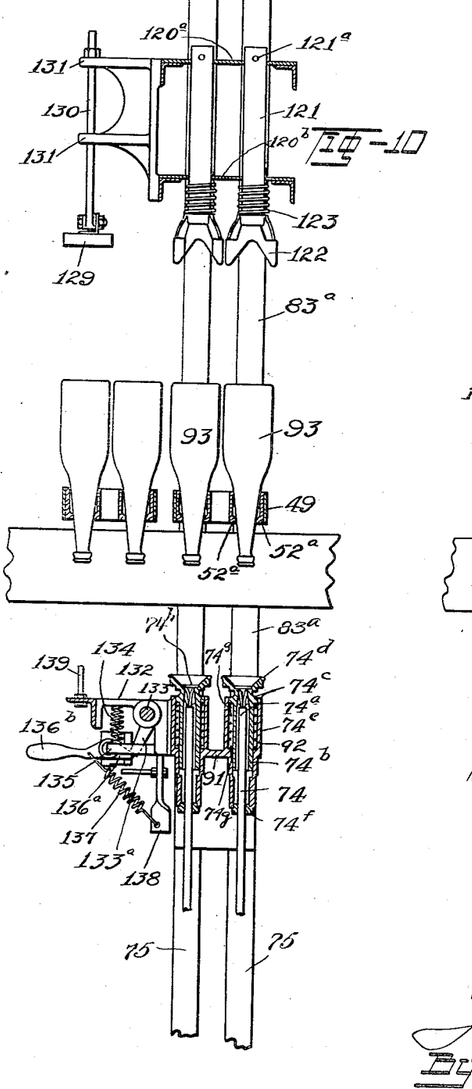
Figs. 10 and 11 sectional details through the internal brushing and rinsing means.
Figure 11:
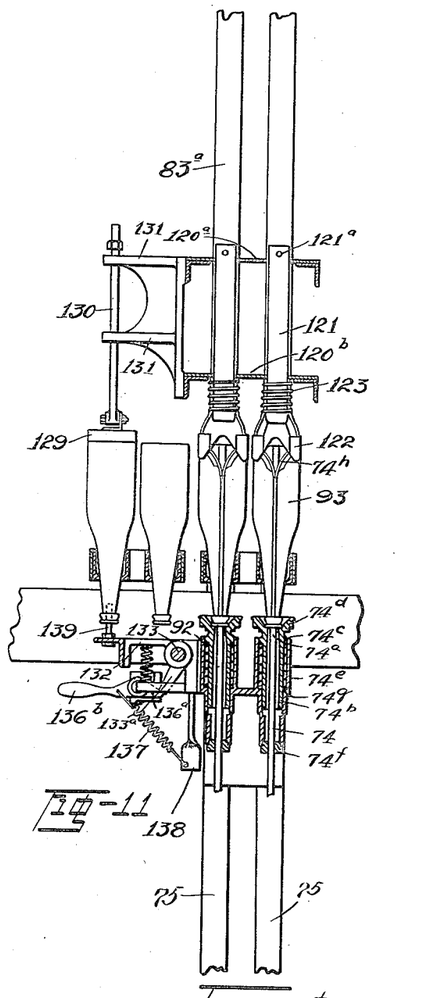
Figure 12:
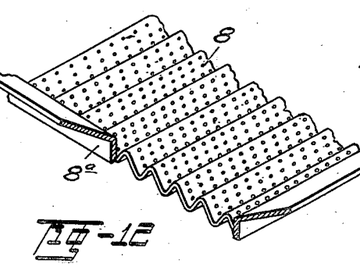
Fig. 12 a detail in perspective of the label collecting section.
Figure 13:
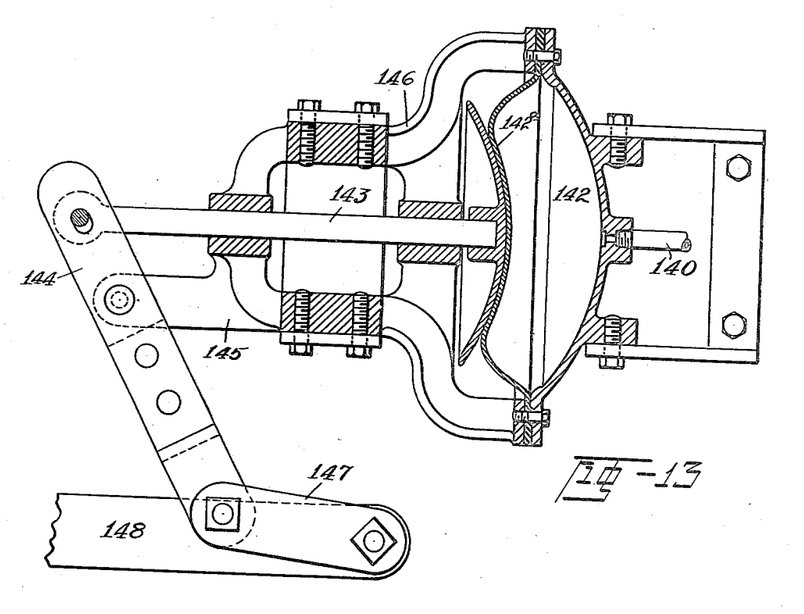
Fig. 13 a detail in section and elevation of a portion of the pneumatic control for automatically stopping certain of the operations of the apparatus.

The upper ends 74ª of the hollow spindles 74 project each into a sleeve 74ᵇ (see Figs. 10 and 11) each having a shoulder 74ᶜ located below a frusto conical cup 74ᵈ. The sleeve 74ᵇ is in turn mounted in a sleeve 74ᵉ carried by the frame work 91 and preferably formed integral therewith, the lower end of said sleeve being provided with a suitable packing device 74ᶠ for the spindle. The sleeve 74ᵉ is enlarged above the frame 91, the upper portion of the sleeve forming a sliding fit with the shoulder 74ᶜ, there being an inwardly projecting shoulder 74ᵍ, between which and the shoulder 74ᶜ a helical spring 92 is inserted. This spring forms a yielding support for the sleeve 74ᵇ. It will be noted that the bore of the sleeve 74ᵇ immediately below the cup 74ᵈ is contracted and is tapered or frusto conical. When the spindles are not being operated, this contracted bore serves to retain the brush members 74ʰ thereof in contracted position so that they may readily enter the bottles thereabove when the frame 91 and the parts movable therewith (including the spindles) are brought into operative relation to said bottles. The frame 91 is shown as carrying the sleeves for all of the spindles. It will be evident that, when the spindles are projected into the bottles, water being supplied therethrough from the box 73 and the hose 77, the interior of the bottles will be simultaneously brushed and supplied with jets of water. Through the differential movement to be described hereinafter, the box 73 and the frame 91 will be raised in unison until the bottle mouth seats 74ᵈ engage the mouths of the bottles 93 thereabove, the springs 92 absorbing the shock of impact so as to prevent fracturing the bottle or injuring the parts; through the operation of this differential movement, further movement of the frame 91 and the attached parts will be suspended while the spindles are being reciprocated within the bottles.

As it sometimes happens that the operator will place upon the conveyor a bottle from which the closure has not been removed, it is important that the spindles and the brushes should not encounter such closure. In order to prevent this action, we have provided means whereby not only the movement of the spindle box will be suspended, but the conveyor drive will be shut down should a bottle be thus inadvertently placed upon the conveyor. We prefer to accomplish this result by means of a clutch interposed in the main driving mechanism and connections whereby the said driving mechanism will be disconnected from the parts driven thereby through the engagement with a bottle closure of a part movable with the frame 91. This automatic feature will be described hereinafter.

The frame 91 and its connected parts are slightly overbalanced by means of weights 93 on levers 94 which are shown as pivoted to the upright frame members 95, the ends of the levers opposite the weights being pivotally connected to links 96, the lower ends whereof are pivotally connected to lateral extensions 91ª of the frame 91, as indicated at 97 mounted in the guides 83ª (see Figs. 3 and 4). The box 73 and its connected parts are counterbalanced by the weights 98 mounted on levers 99 which may be keyed to the rock shaft 100 extending transversely of the apparatus. The ends of the levers 99 opposite the weights are each pivotally connected by a link 101 to the box 73, as indicated at 102.

*Differential drive for brush spindles.*

The box 73 and the frame 91 are moved in unison until the bottle mouths 74ᵈ engage the mouths of the bottles. Immediately upon such engagement, the upward movement of the frame is suspended and the spindles are projected into the bottles. On the reverse movement, as soon as the spindles have cleared the mouths of the bottles, the frame 91 and the box 73 are again moved in unison but in a downward direction. To accomplish this movement, we prefer to employ the lost-motion mechanism shown more particularly in Fig. 4. 103 denotes a crank wheel or disk which is driven from the worm wheel shaft 104 through a worm wheel 105 and the worm 106 on the shaft 42, the last mentioned shaft being driven from the motor 12 and shaft 13 by intermediate driving connections to be described hereinafter. The crank wheel disk has pivoted thereto a connecting rod 107 having a cross-head 108 slidably mounted in guideways 109 in a branch of an angle lever 110, the cross-head being mounted on a screw 111 having an operating handle 109ª. The other branch of said angle lever is rigidly connected to a rock shaft 112. Opposite ends of this rock shaft are connected by means of arms 113 rigid therewith and by links 114 to the box 73 and its connected parts, preferably by the same studs 102 to which the links 101 are connected, the studs being movable in the guides 83ª. With this construction, it will be evident that the rotation of the shaft 104 will merely cause the box 73 and its connected parts to rise and fall, but without necessarily affecting the frame 91 and its connected parts. In order to operate said frame, a stud shaft 115 is employed at one side of the machine as a means for connecting the arm 113 and link 114. This stud shaft extends into a slot carried by an angle arm 116 which is mounted to rock upon a stud 117.

When the parts are in the position shown in Fig. 4 (with the box 73 at the bottom of its stroke) one branch 117ª of the slot is horizontal and the other branch 118 extends upwardly and is curved about the stud 112 as a center. A suitable portion of this arm is connected to one of the links 96 by means of an adjustable link 119. By suitably pivoting the arm 116 and arranging the slots thereof and by connecting the said arm and the link 96 at proper points, when the box 73 is raised from its normal or lowered position, its movement will be transmitted through the arm 116, link 119, and arm 96 to the frame 91 and the box and frame will be raised in unison until such time as the bottle mouth seats encounter the mouths of the bottles thereabove. As soon as this happens, the stud 115 will have entered the curved branch 118 of the slot, and further movement of the frame 91 will be suspended, the frame and the arm 116 being held in elevated position by the weights 93. On the reverse movement of the box 73 (after the spindles have traversed the interiors of the bottles), when the stud 115 enters the branch 117ª (which will be when the spindles have been retracted into their respective sleeves) further downward movement of the box will result in moving the frame downwardly, as shown in Figs. 3 and 4.

In order to hold the bottles in clamped position during the operation of the spindle mechanism, we prefer to employ a construction similar to that shown in our copending application No. 155,422. Mounted on the guides 83ª is the bottle clamping frame 120, said frame comprising generally transversely extending top and bottom plates 120ª and 120ᵇ (see Figs. 10 and 11) forming guideways for the clamps which engage the bottoms of the bottles, each clamp comprising a stem 121 extending through said plates and each having a stop pin 121ª and a cup 122 at its lower end adapted to receive therewithin, and fit against, the bottom of an inverted bottle 93. A spring 123 surrounds each stem 121 between the top of the cup thereon and the bottom plate 120ᵇ; thereby, as the frame descends the clamps will uniformly engage the bottoms of the bottles therebeneath. The clamping frame is operated from the frame 91, being connected thereto in such manner that, when the frame 91 is lifted, the clamping frame will be depressed, and vice versa. The clamping frame is suspended by links 124 pivotally connected to opposite sides thereof (see Fig. 3), each link being provided with a plurality of vertically spaced openings 124ª in the upper end thereof by means of which it may be adjustably connected to a lever 125 pivoted to a bracket 126 on the upper ends of the guides 83ª. This lever carries a segment 125ª having apertures 125ᵇ therein by means of which it may be adjustably connected to a lever 127 (as by means of a pin 127ª) pivoted to the bracket 126. The levers 127 are connected to the lateral projections 91ª of the frame 91 by means of rods 128, the rods extending through the lateral projections and being provided with nuts 128ª and 128ᵇ on opposite sides of said projections.

By this construction, it will be apparent that, as the frame 91 is moved upwardly, the bottle clamp frame is moved downwardly to bring the clamps into engagement with the bottoms of the bottles and that, as the frame 91 is moved downwardly, the bottle clamp frame will be moved upwardly; also that a convenient means is provided for varying the relative movements of the frame 91 and the bottle clamp frame through the adjustable connections described.

*Automatic stop mechanism.*

Figure 14:
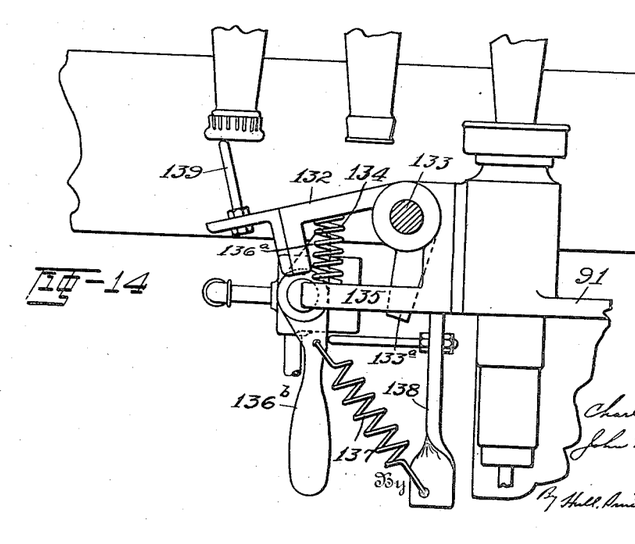
Figure 17:
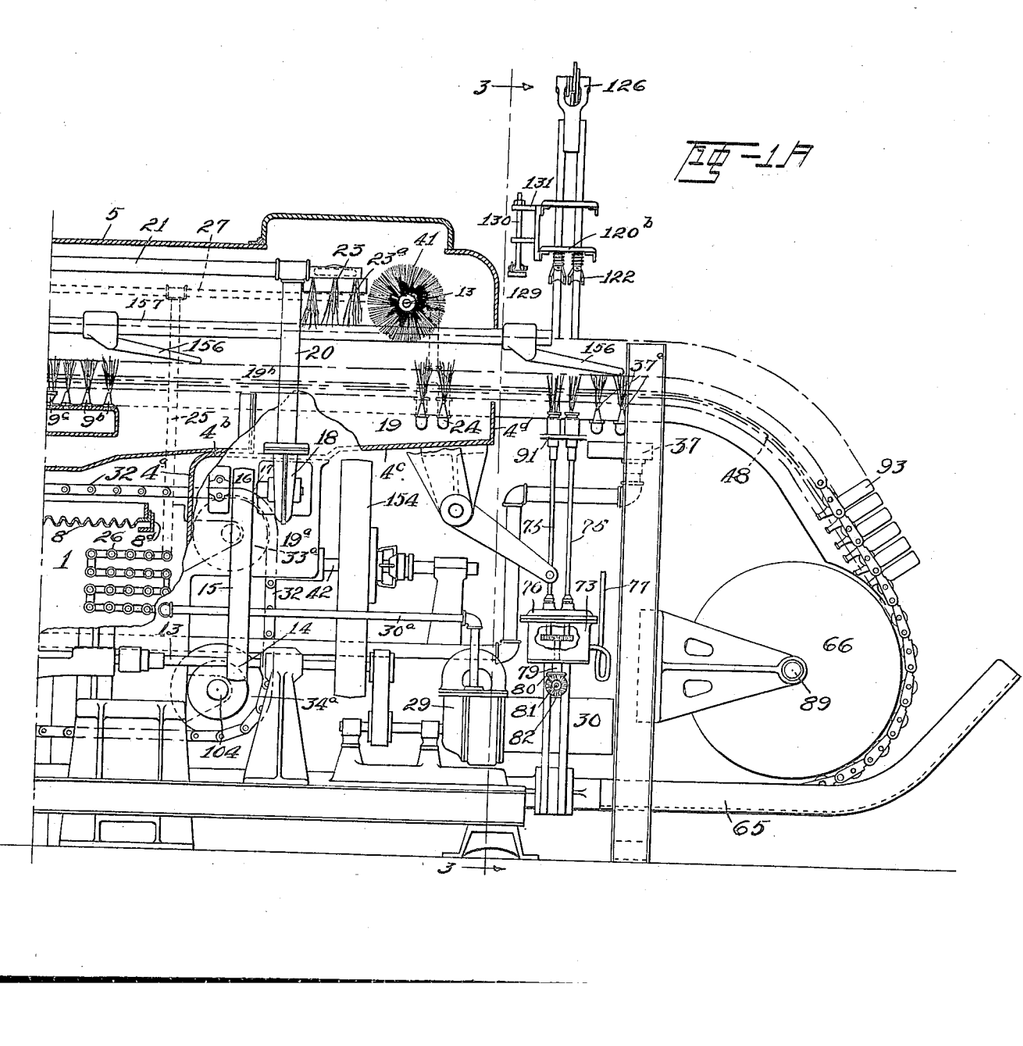

Reference has been made hereinbefore to the provision of means whereby the operation of the spindles and of the conveyor mechanism may be automatically suspended in the event that a bottle having a closure applied thereto has been placed upon a conveyor. We prefer to accomplish this result by means of mechanism connected with the bottle clamp frame and the frame 91. 129 denotes a plate extending transversely of the apparatus and at the rear of the brushing spindles. This plate is shown as carried on rods 130 loosely mounted in guides 131 of brackets projecting rearwardly from the bottle clamping frame (see Figs. 3, 10, and 11). 132 denotes a bracket arm pivotally connected to the rear of the frame 91 by means of a rock shaft 133, said shaft having an arm 133ª projecting therefrom. A spring 134 tends to hold the bracket or arm 132 in substantially horizontal position and with the arm 133ª in engagement with an arm 136ª projecting from a rotary three-way valve 136, said valve having an operating handle 136ᵇ and the lower end of the spring bearing upon an arm 135 carried by the frame 91. A spring 137, connected to the handle 136ᵇ and to a suitable arm 138, tends to rock the valve 136 to a position which will render the apparatus inoperative. At its rear end, the arm 132 is provided with transverse series of pins 139 arranged to register with the mouths of each series of bottles as the conveyor passes thereabove. Should one of these pins encounter a stopper (as shown in Fig. 14) the arm 132 will be rocked against the action of the spring 134, disengaging the arm 133ª from the arm 136ª and permitting the spring 137 to rock the valve 136 to the position shown in Fig. 14. Meanwhile, the bottle is prevented from yielding to an extent to defeat the rocking movement of the arm 132 by means of the plate 129.

However, this plate is permitted to yield upwardly a sufficient distance to prevent the breaking of a bottle.

Figures 5, 15:
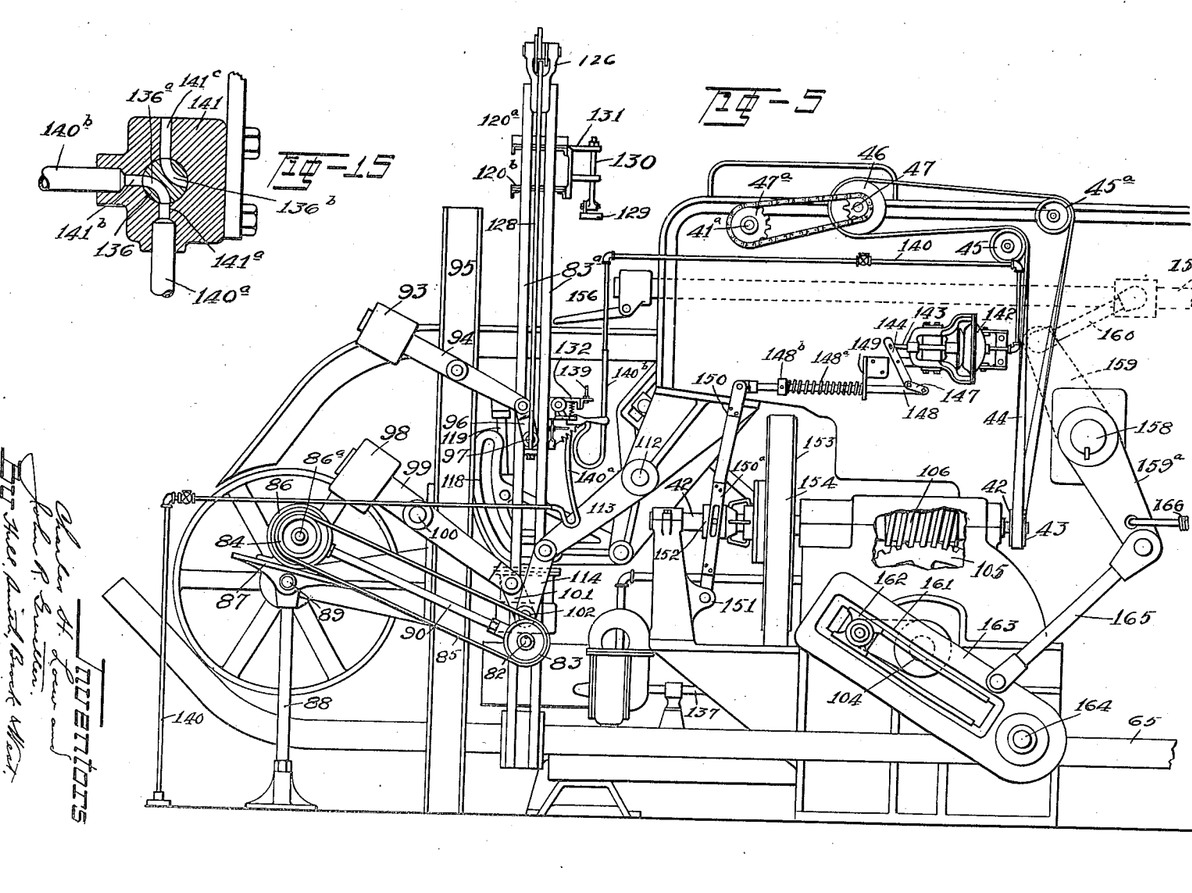

The valve 136 is located in a conduit 140 connected with a source of air under pressure (see Fig. 5), said conduit having therein lengths of flexible air hose 140ª and 140ᵇ which permit of the movement of the frame 91 without breaking the flow of air through said conduit. The air hose 140ª is connected to one side of the valve casing 141 while the hose 140ᵇ is shown as connected to said casing at substantially right angles to the connection 140ª. The valve casing is provided with a passageway 141ª which establishes communication between the air hose connection 140ª and the port 136ª in the valve 136; also with a passageway 141ᵇ extending at right angles to the passageway 141ª. It is further provided with an exhaust passageway 141ᶜ adapted to communicate with a port 136ᵇ in said valve. From the valve casing 141, the air conduit extends to one side of a movable element, as a diaphragm 142ª in a diaphragm chamber 142. The opposite side of the diaphragm is connected by means of a rod 143 with one end of a lever 144 pivoted to a bracket 145 carried by the yoke 146 which supports the diaphragm chamber and which guides the rod 143. The opposite end of the lever 144 is connected by a link 147 with a rod 148 slidably mounted in a bracket 149 carried by the side of the main tank. The opposite end of the rod 148 is pivotally connected to one end of a lever 150 the opposite end of which is pivoted to a bracket 151, the intermediate portion of said lever being provided with a clutch yoke 150ª connected in the usual manner to a clutch 152 which normally insures that the shaft 42 shall be driven from the shaft 13 by means of the pulley 153, belt 154 and pulley 155. A spring 148ª surrounding a rod 148 and bearing at one end against the collar 148ᵇ and its other end against the bracket 149 tends to move the clutch in a direction to break the driving connection between the shafts 13 and 42. This tendency normally is successfully resisted by the pressure of the air within the chamber 142. However, should one of the pins 139 encounter an obstacle, such as a bottle closure, the valve 136, will be rocked a quarter revolution from the position shown in Fig. 15, with the result that the chamber 142 will be vented through the passageways 141ᵇ and 141ᶜ and the port 136ᵇ, thus permitting the spring 148ª to move the clutch and to break the driving connection between the said shafts. Thereupon, the reciprocation of the spindles, the box 73, and the parts connected thereto will be suspended and, as will be pointed out hereinafter, so also will be the movement of the conveyor and of the bottles thereon. This enables the operator to remove from the conveyor any bottle from which the closure may not have been removed and in advance of the registering of such bottle with the corresponding spindle. After such removal, the valve 136 may be closed by hand, thus restoring the co-operating parts to their normal positions and re-establishing the driving connection between the shafts 13 and 42. The location of the valve 136 near the front or delivery end of the machine enables the same to be reached conveniently by an operator and provides a convenient means for stopping the mechanism whenever occasion may require.

*Conveyor drive.*

The means for driving the conveyor is substantially the same as shown and described in our copending application No. 721,107, filed September 18, 1912. This mechanism comprises the ratchet teeth 60 on the side links of the conveyor elements which ratchet teeth are adapted to be engaged by pawls 156 pivotally connected to and depending from rods 157 extending longitudinally of the apparatus. These rods are preferably hollow or tubular and are supported in any convenient manner, as by brackets carried by the upper or cover-carrying portion of the tank. The rods are driven intermittently by means of a transverse rock shaft 158 extending across the tank and having a pair of vertically extending rock arms 159 each connected to a rod 157 by means of a link 160. The rock shaft 158 is driven from the shaft 13 through the shaft 104 and a crank 161 thereon at one side of the apparatus, said crank being connected with a crosshead 162 in a rock arm 163 pivoted to a stud shaft 164 and connected intermediate of its ends by a link 165 with an arm 159ª extending from the shaft 158 in the opposite direction from the arm 159, there being a spring 166 connected to the arm 159ª for the purpose of counterbalancing the rock arm 163 and cushioning the movements of the connected parts. This construction insures a quick driving stroke for the pawl-carrying rods, enabling the said rods to be practically at rest during the greater part of the vertical movement of the end of the crank arm 161.

*Operation.*

From the foregoing description, taken with the drawings, it is believed that the operation will be readily understood. The motor 12 being started, the heated solution from the tank 1 will be supplied by the pump 10 to the washing or rinsing boxes 9 and 9ª and through the nozzles thereof to the interior of the bottles as well as to the exterior of the bottles as they pass from one transverse row of nozzles to the next, the nozzles 9ᶜ serving simultaneously to cleanse the insides and outsides of the bottles as they pass thereabove as well as when they are brought to rest thereabove. Liquid from the tank 1 will also be supplied to the box or pan 10ᵈ for the purpose of loosening and removing the labels that may remain after the bottles have passed the stations 28 and 22. Furthermore, because of the construction of the bottle seats or supports 52, liquid from the nozzles 9ᵇ will have access successively to the front and rear faces of the bottles through the slots 53ᵃ as the bottles are moved step by step through the apparatus. The jet boxes 22 and 23 are supplied with waste water from the jets 23ᵃ and 24 through the tank 19 and pump 18, while the jets 24 and 28 are supplied by the pump 29 with waste water from the tank 30, the water being heated in the coil 26. In passing out of the tank the bottoms of the bottles are subjected to the action of the brush 41 and are then subjected to the internal rinsing and cleaning operation of the spindles 74, being finally rinsed and cooled by the jets from the two transverse series of nozzles 37ᵃ connected with the main. The parts are so timed, that after the spindles have made their stroke within the bottles, the bottle clamping frame is elevated, and the gear spindle box 73 and the frame 91 are retracted before the next forward movement of the conveyor. Should a bottle be applied to the conveyor without having the closure removed therefrom, the conveyor driving mechanism and the mechanism for operating the spindle box, frame 91 and bottle clamp frame will be automatically suspended through the operation of the air valve 136 and will remain so suspended until the valve is again returned to operative position.

The labels and sediment accumulating upon the label conveyor will be conducted to the rear of the machine and there removed, partly by dropping from the downwardly inclined branch of said conveyor between the sprockets 34 and 34ᵃ, the remainder being removed by the jets from the pipe 35 and from the trough 38. Such labels and sediment as may not be connected upon the label conveyor and which may be discharged upon the combined filter and label remover 8 may be removed therefrom through the opening covered by the door 8ʰ and, when necessary, said label remover and strainer may be taken bodily through said opening and cleaned. By transversely corrugating this member, the effective area of perforation thereof is greatly increased and inclined troughs are provided along which the labels and sediment may move toward the outlet closed by the door 8ʰ.

In addition to driving the pumps 10, 18 and 29, through the connections described, the shaft 13 also serves to reciprocate the gear box 73 and frame 91 through pulley 155, belt 154, pulley 153, shaft 42, worm 106, worm gear 105, shaft 104, crank 103, connecting rod 107, rock arms 110 and 113, rock shaft 112, links 114, and slotted arm 116. The shaft 104 also drives the conveyor through the pawls 156, rods 157, links 160, arms 159, rock shaft 158, arms 159ᵃ, links 165, pivoted arm 163 and crank 161. The driving connection between the shaft 13 and the shaft 42 will be automatically broken through the clutch 152, the arm 150, and the train of mechanism interposed between such arm and the diaphragm chamber 142, through the automatic operation of the valve 136 in the manner described hereinbefore. The label conveyor is driven by the sprockets 34ᵃ, said sprockets in turn being driven from the shaft 13, by connections hereinbefore described, through the shaft 104, by which the sprockets 34ᵃ are carried.

Having thus described our invention, what we claim is:—

1. In an apparatus of the character described, the combination, with a tank 1, of a bottle conveyor and means for moving the same above said tank, liquid supply devices 9—9ᵃ arranged above said tank and below said conveyor, means for forcing liquid from said tank to said devices, a series of internal cleaning jets 74 at the rear of the devices, means for conducting liquid thereto, a tank 30 adapted to receive the waste liquid from said jets, a coil 26 in the first mentioned tank, internal rinsing jets 24 located at the rear of the tank 1 and between the said devices and the said jets 74, means for forcing liquid from the second tank through said coil to such internal rinsing jets 24, series of external rinsing jets arranged above the conveyor, a tank 19 arranged to collect the waste water from one of such series of jets and from the internal rinsing jets 24, and means for forcing liquid from said tank 19 through the series of external jets above the conveyor.

2. In an apparatus of the character described, the combination, with a tank 1, of a bottle conveyor and means for moving the same above said tank, of a front series of internal rinsing jets 28, intermediate series of internal rinsing jets 9—9ᵃ, and two longitudinally spaced rear series of internal rinsing jets 24 and 74, of means for forcing liquid from the tank to the intermediate series of jets, a tank 30 for collecting waste water from the rearmost series of jets 74, a heating coil 26 in the first mentioned tank, means for forcing liquid from the second tank through said coil and to the front series of internal jets 28 and the series of internal rinsing jets 24 interposed between the intermediate series and the rearmost series of jets, longitudinally spaced series of external rinsing jets 22 and 23 above said conveyor, a tank 19 arranged to collect the waste liquid from the rearmost series of external jets and the series of internal jets 24, and means for forcing liquid from said tank to the external series of jets.

3. In a bottle cleaning apparatus, the combination of an enclosure, a pair of rails extending transversely thereof, said enclosure having a chamber projecting outwardly from one side thereof and said rails projecting into said chamber, a combined strainer and label remover mounted on said rails, the ends of said rails opposite said chamber being elevated whereby the strainer is supported with the end adjacent to the chamber at a lower elevation than its opposite end, said chamber having a door permitting the removal of said strainer.

4. In an apparatus of the character described, the combination, with a bottle carrier and means for moving the same intermittently, of a series of brush spindles for the bottles on said carrier, a support for said spindles, a series of sleeves adapted to surround and enclose the brushes of said spindles and interposed between the spindle support and the bottle carrier, a rock shaft, means for rocking the same, an arm operated by said shaft and having an angularly disposed slot therein one branch whereof is curved with said shaft, a stud connected with the spindle support and projecting into said slot, and a connection between said arm and said sleeves.

5. In an apparatus of the character described, the combination, with a bottle carrier and means for moving the same, of a series of brush spindles, a support therefor, a series of sleeves, a support for said sleeves and interposed between the spindle support and said carrier, a counter-weighted lever pivoted intermediate of its ends and connected to the sleeve support, a rock shaft, an arm connected to said shaft and having an angularly disposed slot therein one branch whereof is concentric with said shaft, a stud connected with the spindle support and projecting into said slot, and a link connecting said arm with the portion of said lever which is connected to the sleeve support.

6. In an apparatus of the character described, the combination, with a bottle carrier and means for moving the same, of a series of brush spindles, a support therefor, a series of sleeves interposed between said support and said carrier, a counterweighted lever pivoted intermediate of its ends and connected to the sleeves, a rock shaft, an arm connected to said shaft and having an angularly disposed slot therein one branch whereof is concentric with said shaft, a stud connected with the spindle support and projecting into said slot, and a link connecting said arm with the portion of said lever which is connected to the sleeves.

In testimony whereof, we hereunto affix our signatures.

CHARLES H. LOEW.
JOHN R. GRUETTER.